United States Patent
Aday et al.

(10) Patent No.: US 7,370,199 B2
(45) Date of Patent: May 6, 2008

(54) SYSTEM AND METHOD FOR N-WAY AUTHENTICATION IN A NETWORK

(75) Inventors: Michael A. Aday, Bellevue, WA (US); Bryan M. Willman, Kirkland, WA (US); Marcus Peinado, Bellevue, WA (US); Alan S. Geller, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 807 days.

(21) Appl. No.: 10/766,060

(22) Filed: Jan. 28, 2004

(65) Prior Publication Data

US 2005/0204128 A1 Sep. 15, 2005

(51) Int. Cl.
*G06F 21/00* (2006.01)

(52) U.S. Cl. .................................... 713/168
(58) Field of Classification Search ................. 713/168
See application file for complete search history.

(56) References Cited

U.S. PATENT DOCUMENTS

| | | | |
|---|---|---|---|
| 6,609,200 B2* | 8/2003 | Anderson et al. | 713/176 |
| 6,904,418 B2* | 6/2005 | Walker et al. | 705/76 |
| 7,003,480 B2* | 2/2006 | Fox et al. | 705/26 |
| 7,146,500 B2* | 12/2006 | Hawkins et al. | 713/176 |
| 7,167,844 B1* | 1/2007 | Leong et al. | 705/80 |

OTHER PUBLICATIONS

Canetti, R. et al., "Adaptively Secure Multi-party Computation", *Annual ACM Symposium Theory of Computing, Proceedings of the 28th annual Symposium on Theory of Computing*, 1996, 639-648.

Friedman, B. et al., "Trust Online", *Communications of the ACM*, Dec. 2000, 43(12), 34-40.

Canetti, R. et al., "Universally Composable Two-Party and Multi-party Secure Computation", *Annual ACM Symposium on Theory of Computing, Proceedings of the 34th annual ACM Symposium on Theory of Computing*, 2002, 494-503.

Lindell, Y. et al., "On the Composition of Authenticated Byzantine Agreement", *Annual ACM Symposium on Theory of Computing, Proceedings of the 34th Annual ACM Symposium on Theory of Computing*, 2002, 514-523.

Rabin, T. et al., Verifiable Secret Sharing and Multiparty Protocols with Honest Majority (Extended Abstract), *Annual ACM Symposium on Theory of Computing, Proceedings of the 21st Annual ACM Symposium on Theory of Computing*, 1989, 73-85.

(Continued)

*Primary Examiner*—Kambiz Zand
*Assistant Examiner*—Andrew L Nalven
(74) *Attorney, Agent, or Firm*—Woodcock Washburn LLP

(57) ABSTRACT

A method of controlling information exposure in a multi-party transaction includes an originating transaction participant cryptographically encoding all information for each of the transaction participants such that a unique data content and encryption are used for each of the messages destined to the other transaction participants. The cryptographically encoded messages are transmitted to the transaction participants such that each may decrypt their message and respond to a primary transaction participant with status concerning their portion of the transaction. After reception of affirmative status messages from the transaction participants, the primary transaction participant may transmit messages to the responding transaction participants to execute the multiparty transaction. The originating transaction participant may also be provided an indication that the multiparty transaction is executed.

19 Claims, 10 Drawing Sheets

OTHER PUBLICATIONS

Siau, K. et al., "Building Customer Trust in Mobil Commerce", *Communications of the ACM*, 2003, 46(4), 91-94.

Zadeh, J, Ph.D., "Cryptography on the Internet", *Proceedings of the 37th Annual Southeast Regional Conference*, 1999, 6 pages.

* cited by examiner

SYSTEM AND METHOD FOR N-WAY AUTHENTICATION IN A NETWORK

FIELD OF THE INVENTION

This invention relates in general to the field of computer communications. More particularly, this invention relates to the use of a protocol for transactions between multiple parties in a digital transaction.

BACKGROUND OF THE INVENTION

Multiparty transactions are those transactions where more than two parties are involved. The safekeeping of information in a two party transaction may be based on the trust that each party has with each other. However, multiparty transactions often involve one party, for example, a purchaser, utilizing the business contacts of another party, for example, a merchant, to orchestrate the transaction on behalf of the purchaser. The merchant takes the responsibility to execute the transaction for the benefit of the purchaser. This accepted responsibility also extends to protecting information given to the merchant by the purchaser in order to conduct the transaction. For example, in a standard credit purchase, a merchant must get not only order information from the purchaser, but also credit information so that the merchant may conduct the credit check portion of the transaction with the credit bureau. In this scenario, the merchant assumes the responsibility of keeping the purchaser's credit and purchase information secure from others. A much more desirable situation would be one where the purchaser's information has as little exposure as possible to as few parties as possible, and therefore limits the liability of a party receiving the purchaser's information. It is assumed that some potential purchasers may find the risk of personal information exposure too great and consequently become reluctant to engage in a multiparty transaction.

Thus, there is a need for a method for use in multiparty transactions where sensitive information belonging to one party is not distributed to others needlessly. Such a method may have the advantage of lessening sensitive information exposure and increasing confidence in digital transactions. The present invention addresses the aforementioned needs and solves them with additional advantages as expressed herein.

SUMMARY OF THE INVENTION

A method and system of controlling information exposure in a multi-party transaction includes obtaining, from a primary transaction participant, the identity of all other transaction participants and their cryptographic information. An originating party may then cryptographically encode selected information for each of the transaction participants such that a data content and unique encryption are used for each of the transaction participants involved in the transaction. A segmented message containing all of the cryptographically encoded portions may then be sent to a primary transaction participant for distribution. The primary transaction participant may send selected segments or all segments to each transaction participant. Each transaction participant may then decrypt their respective message and respond to the primary transaction participant with status of their transaction portion. After reception of affirmative return status messages from some portion of the relevant participants involved in the transaction, the primary transaction participant may transmit return messages to the responding transaction participants to execute their portion of the transaction. The originating party may also be provided an indication that the transaction is being executed.

BRIEF DESCRIPTION OF THE DRAWINGS

The foregoing summary, as well as the following detailed description of preferred embodiments, is better understood when read in conjunction with the appended drawings. For the purpose of illustrating embodiments of the invention, there is shown in the drawings exemplary constructions of the invention; however, the invention is not limited to the specific methods and instrumentalities disclosed. In the drawings.

DETAILED DESCRIPTION OF ILLUSTRATIVE EMBODIMENTS

Overview

Figure 1:
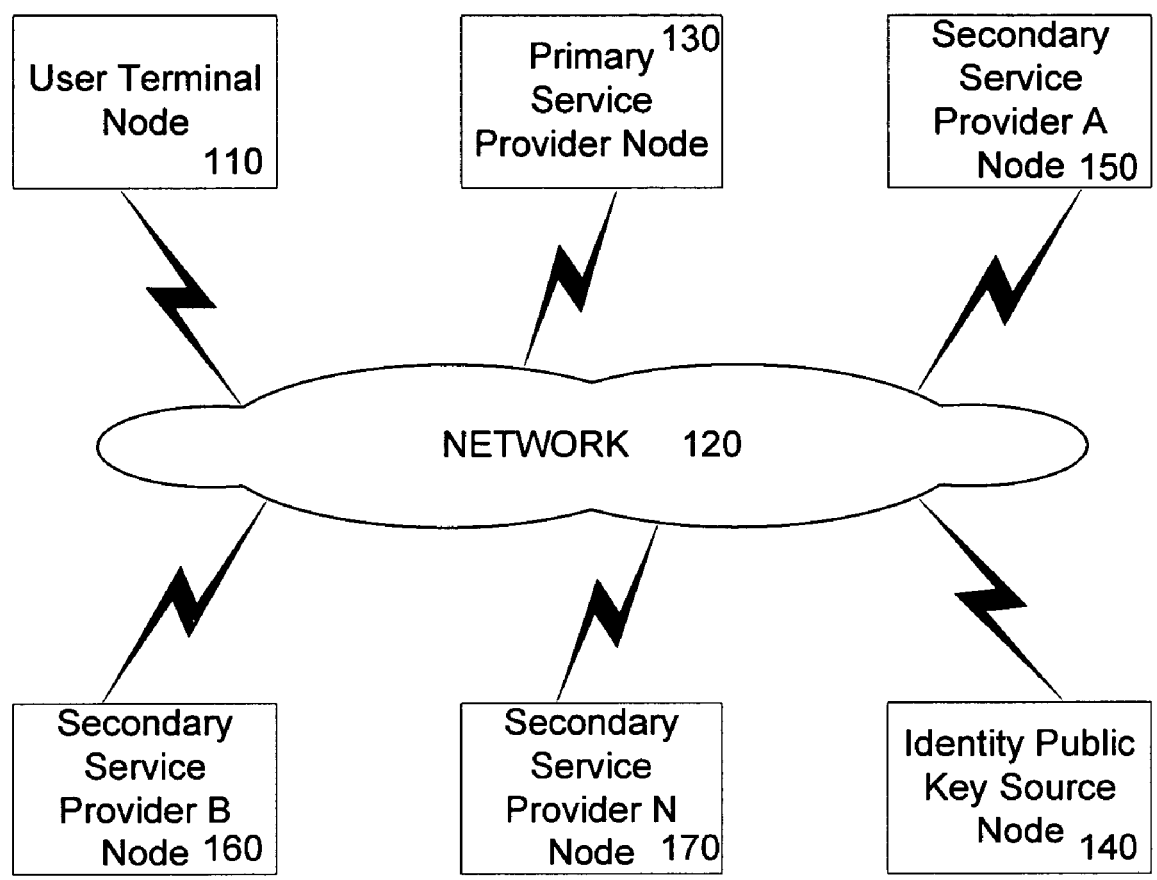
FIG. 1 is a general block diagram of a communications network wherein the invention may be practiced.

It is desirable in multiparty transactions to preserve the security of information possessed by one or more participants to the transaction. At least one embodiment discussed herein achieves the goal of protecting the privacy of information by controlling the access information within a multiparty transaction via segregation and compartmentalization of information enforced by the use of encryption methods.

Using cryptography and an understanding of the participant's role in fulfilling an online transaction, at least one embodiment discussed herein establishes a protocol or general method to allow parties in the transaction to distribute only information that is relevant to the specific roles that the transaction participants fulfill in the transaction. This approach has the benefit of lessening the incurred liability for storage of sensitive information involved in a transaction. This reduction in liability is achieved largely due to prevention of sensitive information from loss, since the information is stored the original, encrypted form which was obtained in the context of the transaction.

The general approach is to use a segmented information package that has multiple data elements, each data element containing information intended for one or more specific receiving party, and being enumerated by a message index for ease of retrieval. Each of the parties participating in the transaction will receive enough information within a data element or elements encrypted to their identities to execute his portion of a transaction. Additionally, each data element is encrypted with a symmetric encryption key which is generated randomly by the client at the time of message creation and is in turn encrypted to a specific recipient's public key and is therefore only useable to the transaction participant that possesses the corresponding private key. A transaction participant may be a trusted trading partner or some other third party for which a public key can be obtained by some standard mechanism, such as a directory query or a direct exchange with the party for the purposes of obtaining the key material. In this model, even if all transaction participants receive the segmented information package in its entirety, each participant will only be able to access the data in the package that is relevant to them and the fulfillment of their role in the transaction. All of the other data will remain encrypted and inaccessible to the parties for which it was not intended.

This method may be used as a protocol to prevent privacy violations and to ensure that transaction participants are not forced to assume higher than necessary liability for the maintenance of the data relevant to a transaction but not necessary for their particular role in the transaction.

After discussing an exemplary network in conjunction with FIG. 1 in which the invention may be practiced, exemplary methods and embodiments will be discussed in conjunction with FIGS. 2-10. An exemplary computing environment is also discussed in conjunction with FIG. 11.

Exemplary Embodiments of the Invention

FIG. 1 illustrates a networked system 100 showing a user computing device node 110, a primary service provider node 130, N secondary service provider nodes 150, 160, 170 and an encryption key source node coupled to a communications network 120. The communication network may be any one or more of an internet connection, a wide area network or local area network connection, a telephone communications connection, a hard-line point to point connection, a wireless RF connection, or other equivalent communications means known to those of skill in the art.

In one embodiment, the user may be a purchaser or consumer of goods and services. The user 110 may wish to purchase goods or services through the use of a primary service provider 130, such as a vendor or merchant. The vendor or merchant may have business contacts with one or more secondary service providers, 150, 160, 170, such as credit verification services, shippers, or other goods manufactures or vendors that may, in some transactions, support the business activities of the primary service provider 130 in supplying goods and services to the user 110. The identity public key source 140 may be a network-based directory, a separate service provider, or simply a service provided by some other supplier that can provide identity public keys to the various participants to a transaction as needed. An identity public key is a public key that corresponds to the private key that is generated in preparation for a certification by an issuing authority. The public portion of the key is passed to the issuing authority for the purpose of being certified in a digital certificate that can be used to prove identity to an inquiring party based on public/private key operation that only the originally requestor of the identity will be able to complete. The identity public keys obtained from the identity public key source will be used in conjunction with the user generated symmetric encryption keys (one for each participant in the transaction) to encrypt content to the identity of the primary and secondary service providers 130, 150, 160, and 170.

In the embodiment of a transaction for a sale of goods, it should be noted that all of the transaction participants 110, 130, 150, 160, and 170 may or may not have a trusted relationship with one another. It is contemplated that in most instances of network based transactions, at least one party may have no previous experience in sharing information with the other parties of the transaction. As such, at least one embodiment discussed herein assists in limiting the dissemination of information between the parties such that the transaction may be completed but sensitive information remains protected.

Figure 2:
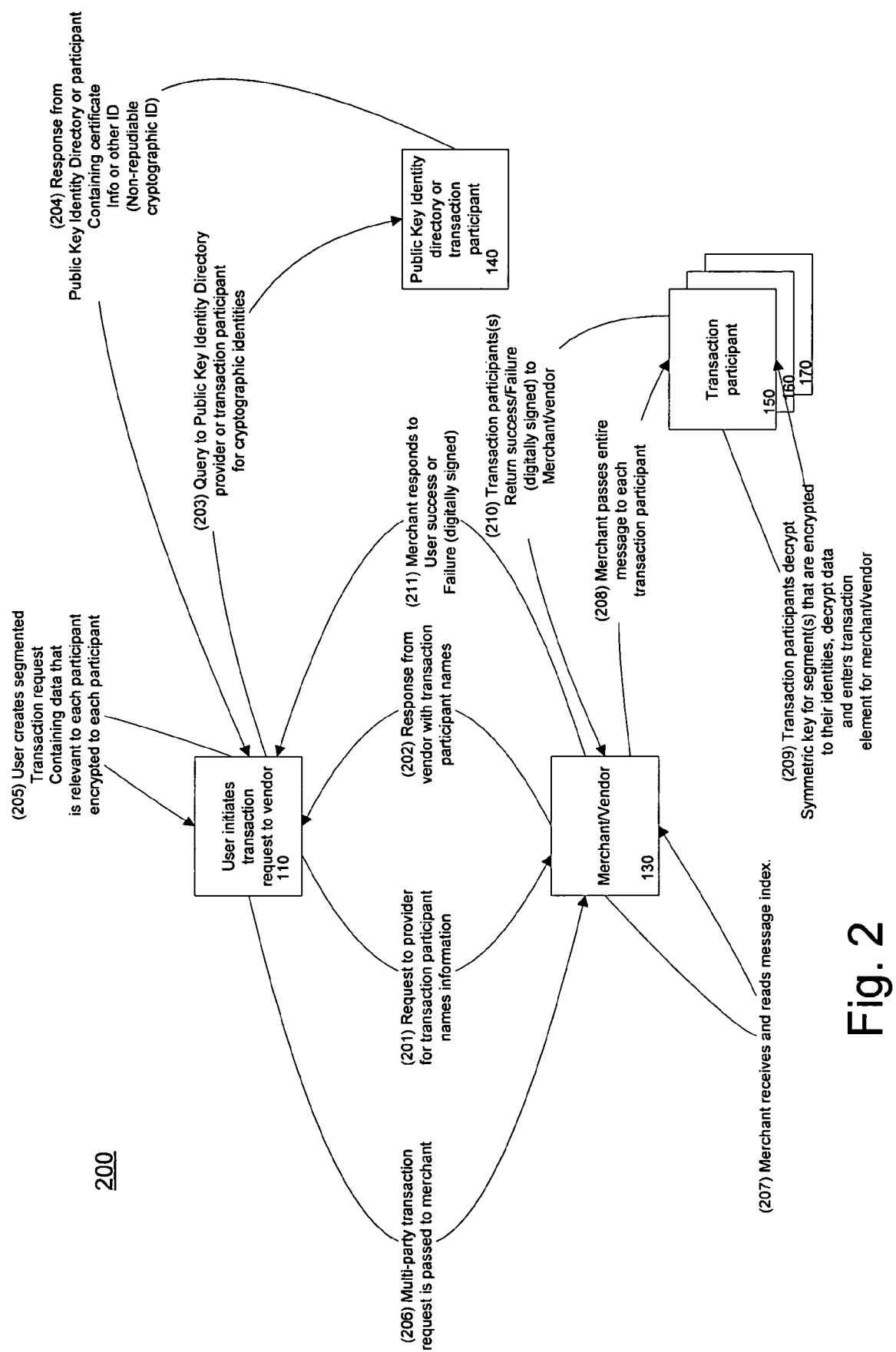
FIG. 2 is a diagram depicting basic aspects of the invention.

FIG. 2 is a diagram 200 which illustrates the sequence of events which may be used to implement a transaction using features of at least one embodiment of the current invention. A user 110 may initiate a transaction request to a vendor by requesting 201 a primary service provider or vendor 130 to provide transaction participant name information. The vendor 130 may respond 202 with the vendor's transaction participants names. The transaction participants would normally be those parties that the vendor 130 uses for a transaction with a user 110. Having received the names of the participants, the user 110 then requests cryptographic identities 203 for the transaction participants. This request 203 may be made to either a public key identity directory, such as a central database of cryptographic identities or the request 203 may be made to the transaction participants themselves. In either event, a response 204 from the directory or the participant may contain digital certificate information or other form of non-repudiable cryptographic identity.

The cryptographic information obtained via the response 204 enables the user 110 to construct a segmented message 205 that contains a message index for enumerating the segments of the message, and compartmentalized data that is relevant to each participant (the individual encrypted segments). The individual segments that make up the segmented message are cryptographically encoded using, for example, a symmetric key that was generated by the user for each of the transaction participants and which is then encrypted to their specific public key—obtained from their certified identity, such that only a party with a corresponding private key may decrypt the symmetric key and in turn encrypt the data content of the segmented message intended for them. After the segmented message is generated, the user transmits the segmented message 206 to the merchant 130. This transmission represents the full request by the user to the vendor to start a multiparty transaction.

Once received by the vendor, the vendor reads the message index 207. Copies of the message are transmitted 208 to each of the participants to whom a segment is encrypted. The receiving participants then decrypt 209 the symmetric encryption key for segment(s) that are encrypted to their public key identities using their corresponding private key and, in turn, decrypt the data contained in the segment with the symmetric encryption key. The decrypting parties then enter the transaction element for merchant/vendor 209 and are then free to act upon the data contained in the decrypted segment or segments. For example, if the data content of the message is to verify that the receiving participant has the resources to complete their part of the transaction, then the receiving participant may return 210 a status message to the vendor that the transaction is completed, may be accomplished, or will fail.

Upon receipt of the success or failure status of the return 210 message, the vendor may respond to the user that the transaction may be completed. It is contemplated that the vendor returns this status for several reasons. First, it is an assumption the user has chosen to allow the primary vendor 130 to be the broker for the transaction and that all status should come from the vendor. Second, it is assumed that the vendor may obtain status from each of the transaction participants 150, 160, and 170 before the vendor 130 signals to the user 110 that all portions of the overall multiparty transaction have occurred or may be accomplished. Naturally, the user could decide to process all of the return status messages 210 himself and as a result, participant 150, 160, and 170 could send their status 210 directly to the user 110. However, in the current context, the user has requested the vendor to be the gateway for the execution of the transaction.

Figure 3:
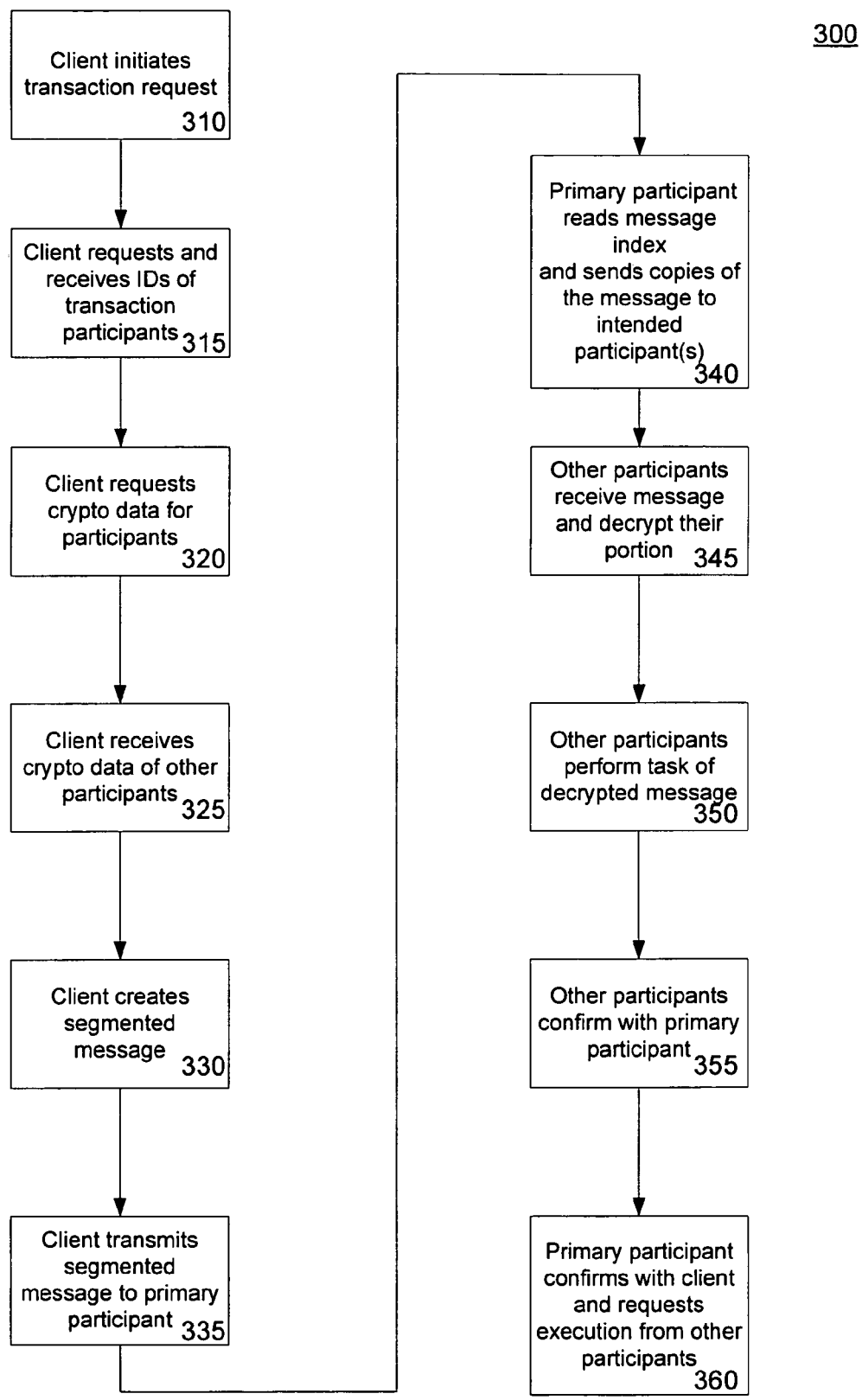
FIG. 3 illustrates an exemplary flow diagram of a general embodiment the present invention.

FIG. 3 depicts a flow diagram 300 of the general method of at least one embodiment of the present invention. Initially, client software, under the control of a user or originating party, initiates a transaction request 310. A user may operate a computer having client software that functions to orchestrate the multiparty transaction from the user's point of reference. A transaction may be any transaction that normally involves multiple parties that need to receive sensitive items of information from the client. Transactions such as on-line purchases for goods or services as well as applications for credit or purchase money transactions may be applied to the transaction model. Normally, in these types of transactions, a central vendor, merchant, or goods and services broker may serve as the primary transaction participant. The primary transaction participant typically has lower-tier service providers, vendors, merchants or other secondary transaction participants that assist the primary transaction participant in performing the transaction. For example, a broker of goods may have, as secondary transaction participants, several manufacturers of brokered goods.

After the client initiates the transaction request 310, the client may request and receive 315 identifiers for the transaction participants. In one embodiment, the client may gain the transaction participant information from the primary transaction participant. In this situation, the primary transaction participant may desirably respond with the identities of the secondary transaction participant involved in the specific transaction requested by the client. For example, if a goods or services purchase is requested of a vendor, where the vendor is acting as the primary transaction participant, the vendor can respond with the contact information for the credit card clearing house it uses to check on credit use and a shipper that it uses for transport of the goods or services. The credit card clearing house and the shipper are examples of the secondary transaction participants.

Once the initiating client receives the identities of the secondary transaction participants, the client may request 320 and obtain 325 cryptographic information to be used in sending messages to the identified secondary transaction participants. There may be several ways the client may obtain cryptographic information concerning the transaction participants. For example, the client may obtain the cryptographic information directly from the secondary participants. In this instance, the secondary participants may provide the client with the equivalent of a unique public key for encryption of symmetric keys that are, in turn, used to encrypt data directed towards the secondary transaction participant. Alternately, the client may access a database or other store of secondary transaction participants and their associated public keys. The database accessed for this purpose may be a third party, known and trusted by both the participants and the user operating the client software. For example, the third party database may be the issuer of the cryptographic keys or a database operated by the same entity wherein cryptographic information, such as public keys, are made available to bona fide clients having participant IDs. Another possible database option is a database local to the client wherein cryptographic information concerning the participants is stored.

Once the client has obtained access to the cryptographic keys of the secondary transaction participants, the client creates a segmented message 330. The segmented message is a message that contains a message index and multiple separable sections, or portions. Each separate portion contains only the specific information required by the secondary transaction participant to enable that participant to proceed with the transaction. Additionally, since each separate portion is individually encrypted to protect its contents from exposure to others, only the targeted secondary participant who has the corresponding decryption key can decrypt and understand the contents even if they are in possession of the entire message. In this way, each individual secondary transaction participant has access to only a compartmentalized portion of information. The secondary transaction participants may not be able to access encrypted data that other participants receive because they may not have a need to know the contents of the encrypted data. This compartmentalization applies to both primary and secondary participants. In this manner, transaction participants cannot obtain access to information that is superfluous to their function in the transaction.

For example, in the purchase of goods from an on-line store, the on-line store may need to know only the quantity and type of goods being ordered. The on-line store need not know what credit card number the purchaser is using. The on-line store or merchant need only know that the purchaser or user is approved for the credit purchase of the goods. However, the credit card clearing house does have a need to access the details of the credit card and the amount to be charged. However, the credit card clearing house may not need to know what items are being purchased. Similarly, the shipper needs to know an address of where to send the goods. Generally speaking, the on-line store may not need to know the shipping address of the goods. By segregating specific "need to know" information to each transaction participant, the total spectrum of information concerning the purchaser need not be exposed to every transaction participant. This reduction of information has the advantage of safekeeping the purchaser's information such that the purchaser may realize an increased level of security and protection.

The determination of what data need be provided to which vendor may be provided in the client software. For example, in generating a segmented message, a client may have information concerning the transaction participants that indicates that specific portions of the client's information need be sent to more than just one participant. One example would be that a credit card clearing house may wish to have not only the credit card details, such as name on the card, actual number, and expiration date, but may also wish to have information concerning the shipping address of the articles purchased so as to ensure that the articles are being shipped to the credit card owner. This information may be useful to fight possible fraud in credit card use. Thus, the credit card clearing house may wish to see information normally given only to the shipper.

This type of data sharing may be accomplished many ways. For example, the relevant shipping information desired by the credit card clearing house may be packaged into a data segment that the credit card clearing house receives. That is, the credit card clearing house data segment may contain credit card information plus the shipping information. The shipper could also be sent the same shipping address information in a different data segment without the credit card data. An alternate method is to send only the credit information in a credit data segment encrypted to a symmetric key available only to the credit card clearing house by virtue of it having been encrypted to the shipper's public key; and to send the shipping information to the shipper in a shipping data segment encrypted to a symmetric key available only to the shipper by virtue of it having been encrypted to the shipper's public key. If the credit card clearing house requires the shipping information from the full segmented message, the credit card clearing house would have to decrypt the shipper's data segment. In order to accomplish this, the credit card clearing house would have to retrieve the decryption key for the shipper's data segment from some authority such a third party cryptographic key issuer or from the shipper itself. Alternately, the data to be shared may be encrypted with a key that is readable by both the shipper and the credit card clearing house because the decryption key is sent in a data segment encrypted with the decryption scheme specified for each party. Using this last scheme, when each party, using their specific decryption mechanism decrypts the data intended for them, they may also decrypt a key that allows them to open the shared data. Using any of these techniques, the sharing of data contained in data segments is possible with proper construction of the segmented message and proper decryption authorization. In yet another method embodiment for sharing key data, two symmetric keys for the same segment may be generated such that a segment is encrypted twice (once to each recipient). Then, the recipients may be allowed to retrieve different keys to access copies of the same data. Yet another modification would be to encrypt both segments with the same key and further encrypt that key to both identities. In any case, information already contained in one segment need not be copied into another segment.

Returning to FIG. 3, the client creates a segmented message 330 and subsequently transmits the segmented message to the primary transaction participant 335. The primary participant may then take the message and may transmit 340 all or selected parts of the encrypted portions of the segmented message to the individual secondary transaction participants. Desirably, the primary participant may send the entire message to their intended recipients. However, since each encrypted portion is encrypted differently for each separate secondary participant, only messages intended to be read by the specific secondary participant may be decrypted and read 345. The other information, if sent to the other secondary participants, remains encrypted and thus inaccessible by other transaction participants without the proper decryption keys.

Upon receipt and decryption of the encrypted portion of the segmented message, the secondary transaction participants may perform the task 350 indicated in the decrypted message. For example, if the encrypted message was sent to a credit card clearing house, the message may include a credit card number, expiration date, address of the card holder, and purchase amount. The indicated task may be to verify that credit for the purchase amount may be extended.

After performing the task 350, the secondary participants may confirm 355 with the primary transaction participant as to the status of the task. For example, in the goods purchase example, the credit card clearing house may investigate the potential purchase and relay an acceptance or rejection to the primary transaction participant. After all or some subset of secondary transaction participants have responded to their respective indicated tasks, the primary participant may decide, based on the approval or disapproval status of the confirmations received, whether to confirm with the client 360 and request that each secondary participant execute his portion of the transaction such that the overall transaction may be accomplished.

One implementation of the current invention may be an on-line transaction to purchase goods from a vendor. In this embodiment, the general method of FIG. 3 may be employed. However, added details may also be employed to customize the application of the general method to the embodiment.

Figure 4:
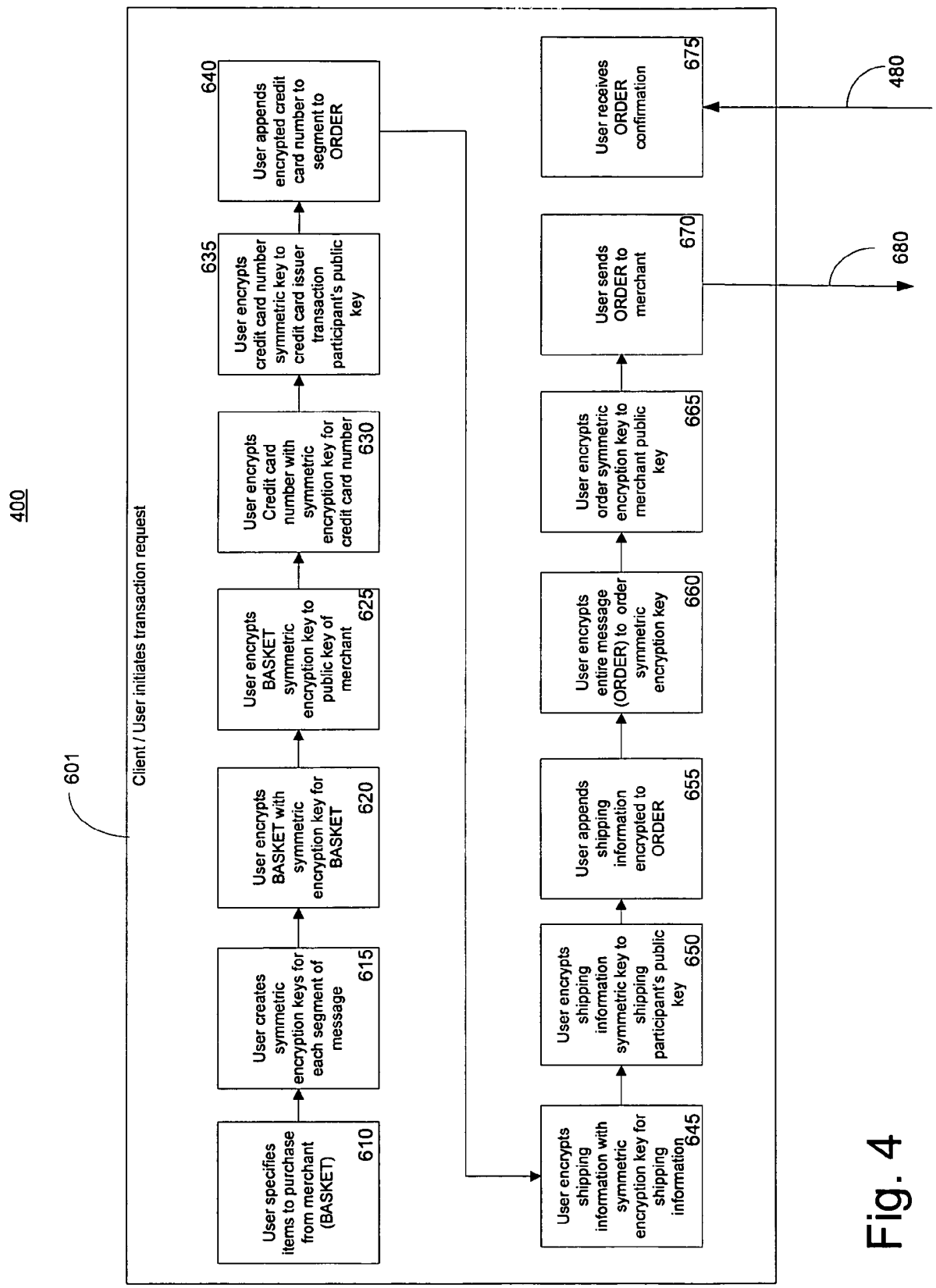
FIG. 4 illustrates a first portion of a functional flow diagram of an exemplary on-line transaction embodiment in accordance with the present invention.
Figure 5:
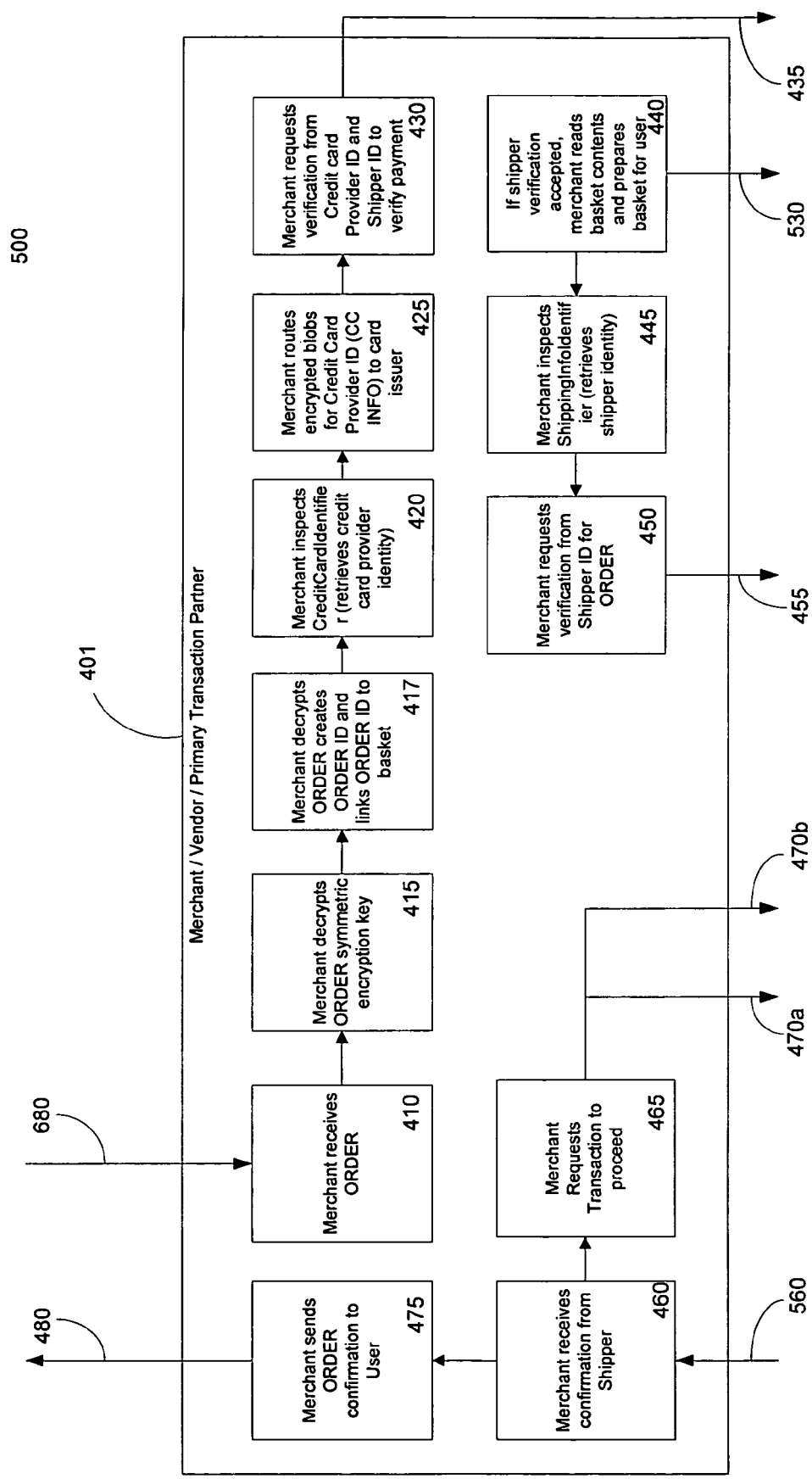
FIG. 5 illustrates a second portion of a functional flow diagram of an exemplary on-line transaction embodiment in accordance with the present invention.
Figure 6:
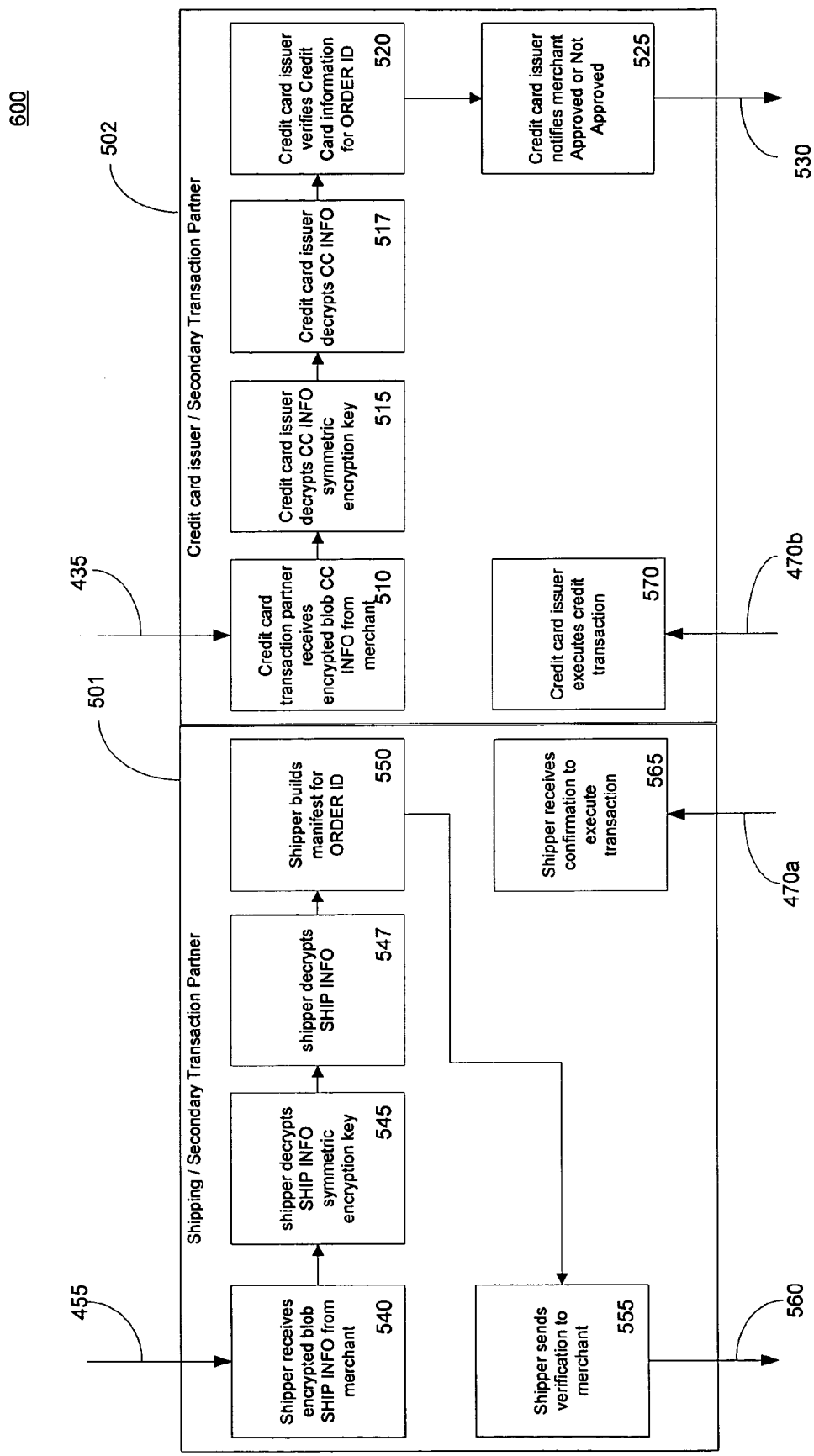
FIG. 6 illustrates a third portion of a functional flow diagram of an exemplary on-line transaction embodiment in accordance with the present invention.

FIGS. 4, 5 and 6 depict stages of an embodiment concerning the purchase of goods in an on-line transaction. FIGS. 4, 5, and 6 are interconnected and represent the stages of the transaction as it proceeds from the client of FIG. 4 through the vendor of FIG. 5 and via the secondary transaction participants of FIG. 6 which include a credit card issuer and a shipper.

Beginning with FIG. 4, a user 601, having client software running on a computer, initiates an on-line transaction with a vendor of goods. The client or user specifies items for purchase from a merchant 610. Typically, on-line transactions utilize a familiar shopping cart or shopping basket in which a purchaser assembles the listing of goods to be purchased. The user then decides to purchase the list of goods in his basket and the client software 615 creates a symmetric key for each segment of the message. The user then encrypts 620 the basket symmetric encryption key using the public key of the merchant or vendor who will act as the primary transaction participant. This encrypted message forms the merchant segment of the segmented message.

Figure 7:
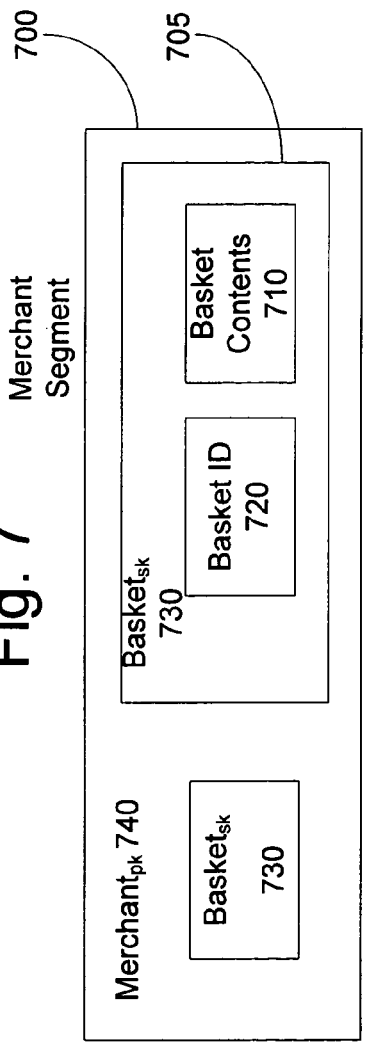
FIG. 7 illustrates a data segment in an exemplary embodiment of the present invention.

FIG. 7 illustrates graphically the form of the merchant segment 700 formed by the client software. The contents of the user's basket 710 are included with a basket identifier 720, generated by the client software for the merchants use in identifying the particular basket. The combination 705 of basket ID 720 and basket contents 710 are cryptographically encoded using the basket symmetric encryption key 730 (Basket$_{sk}$). The basket symmetric key 730 is then also separately encrypted with the merchants public key 740 (Merchant$_{pk}$) resulting in the encrypted message 700 for the merchant. Thus encrypted, only a merchant having a private key corresponding to the merchant's public key may decrypt the symmetric encryption key, and subsequently the message to gain access to the basket contents 710, basket ID 720, and the basket symmetric key 740 of the message segment 700.

The cryptographically encoded message segment generated by the client concerning the basket contents may take the following descriptive form.

Merchant Segment=E(Merchant$_{pk}$(Basket$_{sk}$))+(E(Basket$_{sk}$(basket ID+basket contents))) where the basket ID is an identifier generated by the client software, the basket contents are the contents of the basket generated by the user, merchant$_{sk}$ is the merchants public key, and Basket$_{sk}$ is the symmetric encryption key for the basket. In general the designation E(Participant$_{pk}$, (data)) represents data that has been cryptographically encoded using a public key that is issued for a participant. Additionally, the designation E(Basket$_{sk}$(data)) represents data that has been cryptographically encoded using a symmetric key that was created by the user. In the specific case of the message segment 700 generated by the client, the data is (basket ID+basket contents) and the key used in the encryption is the symmetric key 730 created by the user for use with the basket. The basket symmetric key 730 is itself encrypted using the merchants public key 740.

In the current embodiment example, it is assumed that the public key encryption information for the primary transaction participant, the merchant or vendor, and the secondary transaction participants has already been provided to the client via a trusted third party as discussed above with respect to FIGS. 2 and 3. The encryption method used in the current exemplary embodiment is a symmetric key, such as an AES encryption key, created by the user for each message segment, used once, and then retired. This symmetric key is then encrypted to the desired recipient using the public/private key encryption/decryption scheme as is commonly used in RSA type encryption systems. RSA Security, Inc. manufactures public/private key systems for use in secure communications on networks. However, as would be apparent to those of skill in the art, other encryption/decryption schemes may replace the public/private key system or the symmetric key encryption system. The resulting replacement would be in keeping with the tenants of at least one embodiment of the current invention to include encryption as one basis for segregating sensitive information.

Figure 8:
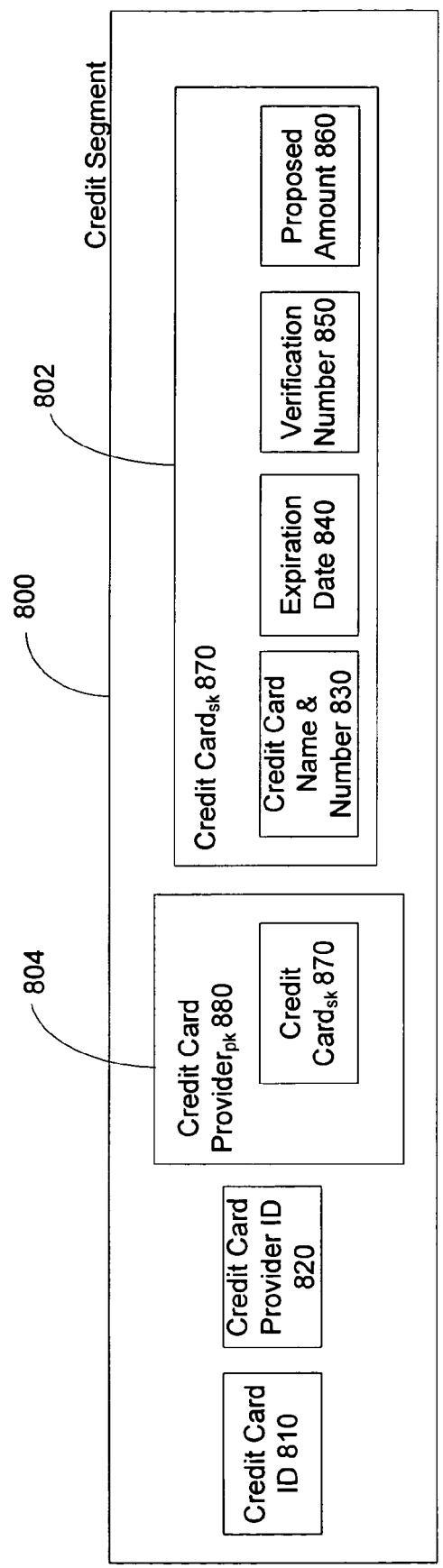
FIG. 8 illustrates another data segment in an exemplary embodiment of the present invention.

Returning to FIG. 4, the client software may encode the users credit card name and number, expiration date, verification number, and proposed dollar amount using a symmetric key created by the user for this purpose 630. This symmetric key can then be encrypted to the public key of the credit card issuer 635 and append 640 the resulting encrypted message to the encrypted basket information. FIG. 8 illustrates graphically the form of the credit segment formed 800 by the client software. A credit card identifier 810 used to identify a users credit card and a credit card provider identifier 820 may become part of the credit segment 800. Additionally, the actual credit cardholder name and credit card number 830, the expiration date 840, the card verification number 850, and the proposed credit charge amount 860 may be assembled and cryptographically encoded 802 with a symmetric key intended for this purpose (Credit Card$_{sk}$) 870. The credit card symmetric key 870 is encrypted 804 to the credit card provider public key 880 (Credit Card Provider$_{pk}$). The addition of the credit card 810 and provider's 820 identifiers results in the encrypted message 800 assembled for the credit card provider. Thus encrypted, only a participant having the credit card providers private key may decrypt the message to gain access to the data contents 830, 840, 850, 860, and 870 of the message segment 800.

The cryptographically encoded message segment generated by the client concerning the credit card data content may take the following descriptive form.

Credit Segment=Credit Card ID+Credit Card provider ID+E(Credit Card Provider$_{pk}$(Credit Card$_{sk}$))+(E(Credit Card$_{sk}$(credit card name and number+expiration date+verification number+proposed amount))) where the credit card ID identifies a type of card held by the user and the credit card provider ID identifies a named provider of credit services. Encrypted with the credit card provider public key, Credit Card Provider$_{pk}$, is a symmetric key, Credit Card$_{sk}$, created for the purposes of encrypting credit card information by the user and used to specifically encrypt the credit card name and number, expiration date, verification number, and proposed amount. The credit card symmetric key 870 is itself encrypted to the Credit Card Provider's public key, Credit Card Provider$_{pk}$, 880.

Figure 9:
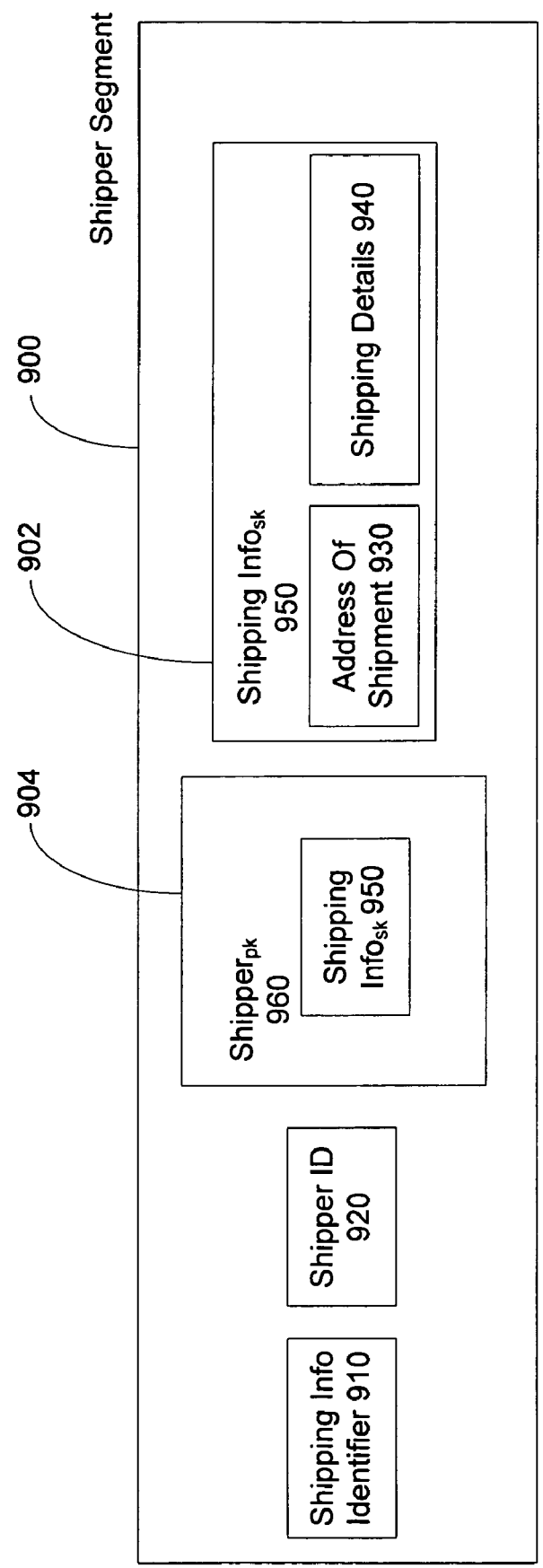
FIG. 9 illustrates another data segment in an exemplary embodiment of the present invention.

Returning to FIG. 4, the client software may then encode the shipping information such as the shipping address and other shipping information using the symmetric key for the shipping information 645, and further encrypt the shipping information symmetric key to the public key of the shipper 650. After completing the previous steps, the user can append 655 this information to the encrypted basket information. FIG. 9 illustrates graphically the form of the shipper segment 900 formed by the client software. A shipping information identifier 910 used to identify the shipping information of the user and a shipper identifier 920 may become part of the shipper segment 900. Additionally, the address of the shipment 930 and other shipping details 940 may be assembled 902 and cryptographically encoded with the symmetric key, shipping info$_{sk}$, 950 intended to encrypt shipping information. The shipping info symmetric key 950 is encrypted 904 using the shipper public key, Shipper$_{pk}$, 960. The assembly of the shipping identifiers 910, 920 and the encrypted shipper's symmetric key 904 and the shipper's info 902 results in the encrypted message 900 intended for the shipper. Thus encrypted, only a participant having the shipper's private key may decrypt the message to gain access to the data contents 930, 940 and 950 of the message segment 900.

The cryptographically constructed shipping message may take the following descriptive form.

Shipper Segment=Shipping Info ID+Shipper ID+E(Shipper$_{pk}$ (Shipping Info$_{sk}$))+(E(Shipping Info$_{sk}$ (Address of shipment and other shipping details))) where the shipping info ID 910 is an identifier for the set of information that represents the data for the shipper, the shipper ID 920 identifies the shipper himself. The shipping information symmetric encryption key 950, shipping info$_{sk}$, is encrypted with the shipper public key 960, shipper$_{pk}$. The shipper's symmetric key 950 is used to encode the shipper data, address and other shipping details 930, 940.

Figure 10:
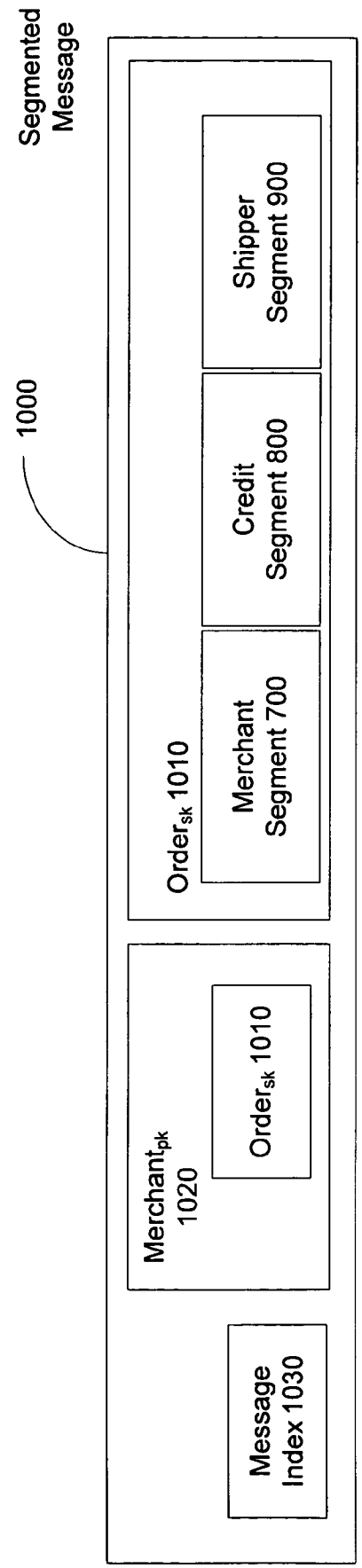
FIG. 10 illustrates a segmented data message of an exemplary embodiment of the present invention.

Referring to FIG. 4, the client software may then take the merchant segment (the result of operations 615-625), the credit segment (the result of operations 630-640), and the shipping segment (the result of operations 645-650) to form the segmented message corresponding to the order for the goods. The segmented message may then itself be encrypted with a symmetric key created by the user for this purpose 660 and that symmetric key used in operation 660 may be further encrypted to the merchants public key 665, resulting in a segmented message. Portions of this message will be readable to transaction participants based on their possession of corresponding private keys, however, it may be preferable that no one participant would have access to all of the data in the message segments, even if they were in possession of the entire encrypted message. FIG. 10 illustrates the construction of the segmented message. The merchant segment 700, the credit segment 800, and the shipper segment 900 are themselves encrypted using the order symmetric encryption key, order$_{sk}$, 1010. The order symmetric key is itself encrypted to the merchants public key 1020. Additionally, a message index 1030 is appended to the front of the message resulting in the generation of the complete segmented message 1000. This is one form of the message that the client may send to the primary merchant for initiation of the order to the merchant for goods.

The cryptographically constructed segmented message may take the following descriptive form. Segmented Message=Message Index+E(Merchant$_{pk}$(Order$_{sk}$))+E(Order$_{sk}$(E(Merchant$_{pk}$(Basket$_{sk}$))+(E(Basket$_{sk}$(basket ID+basket contents)))+Shipping Info ID+Shipper ID+(E(Shipper$_{pk}$(Shipping Info$_{sk}$)))+(E(Shipping Info$_{sk}$ (Address of shipment and other shipping details)))+Credit Card ID+Credit Card provider ID+(E(Credit Card Provider$_{pk}$(Credit Card$_{sk}$))+E(Basket$_{sk}$(credit card name and number+expiration date+verification number+proposed amount))))) where each portion of the descriptive form is previously described.

Returning to FIG. 4, the user may then direct the client software to transmit the order to the merchant 670. The sent order 680 of FIG. 4 is linked to FIG. 5 as the merchant receives 410 the order in the form of an encrypted and segmented message. The merchant may then decrypt the order symmetric encryption key 415 in order to recover the other encrypted portions of the segmented message which are destined for other participants in the transaction. The merchant next creates an order identifier 417 (order ID) because the incoming segmented message represents a new order. The merchant may inspect 420 the credit card identifier placed into the segmented message to identify the provider of the credit card being submitted by the user and its corresponding destination. The merchant may then route 425 the encrypted portion of the credit card binary large object (blob) to the credit card provider for credit verification 430 checking.

The encrypted data 435 destined for the credit card issuer of FIG. 5 is linked to FIG. 6 as the credit card transaction participant receives 510 the encrypted blob 435. The credit card participant may then decrypt the credit card information symmetric encryption key 515 and uses this key to decrypt the credit card information 517 blob to expose the information. The credit card participant may then confirm or deny the grant of credit corresponding to the order identifier 520 to notify the merchant of the approval status 525.

The approval status 530 of FIG. 6, destined for the merchant, is linked to FIG. 5 as the merchant receives 440 the approval status. If credit is approved, the merchant further processes the user's basket by reading 440 shipping information related to the goods placed in the basket. The merchant retrieves the shipper identity 445, and requests verification from the shipper that it can ship the goods in the basket 450.

The verification request 455 including order identifier and related shipping information 455 of FIG. 5 is linked to FIG. 6 as the shipper receives the encrypted blob 540 including the shipping information from the merchant. The shipper decrypts the shipping information symmetric encryption key 545 and uses this key to decrypt the shipping information 547. The shipper uses the information obtained in 547 to build a manifest 550 for the order using the order identifier given to him by the merchant. If the shipper can verify that the shipment is possible, then the shipper may send a verification message to the merchant 555.

The shipping verification 560 including the order identifier of FIG. 6 is linked to FIG. 5 as the merchant receives confirmation that the shipment is possible 460. The merchant now has verified that credit may be extended to the user and the shipment is possible on the order received and identified. As such, the merchant may now send an order confirmation to the user 475 as well as a request to begin processing the actual transaction 465.

The order confirmation message 480 of FIG. 5 is linked to FIG. 4 as the order confirmation is received 675. This action notifies the user that his order has been accepted and is being executed. In an alternate embodiment, (not shown) the user may receive the order confirmation 675 and be given the option of requesting the merchant to finally execute the transaction. In this alternate embodiment, the merchant would then generate the request for the transaction to proceed 465 of FIG. 5.

In either embodiment, the request for the transaction to be finally executed 470a, b of FIG. 5 is linked to the reception of that request by the shipper 565 and by the credit card issuer 570 (see FIG. 6). The shipper may then proceed to ship the contents of the order and the credit card issuer may debit the account of the user according to the value of the order.

The on-line product purchase example of FIGS. 4-6 is meant to be illustrative and not limiting of the application of embodiments of the present invention. The principles highlighted by the exemplary embodiments expressed herein may be applied to any circumstance where there is an application for compartmentalized or segregated information in a multiparty transaction used to protect and restrict the distribution of superfluous information to transaction participants.

As mentioned above, FIG. 1 may represent an exemplary network environment for a system implementing embodiments of the present invention. As such, an exemplary system may include a user or client computer node hosting software for the generation of a segmented transaction request, a primary transaction system node capable of reception and processing of the segmented transaction request, and one or more secondary transaction system nodes being capable of reception and processing of the encrypted messages sent from the primary transaction system node. A source of cryptographic information may be located anywhere on the network and need not be an independent node. The encryption information may be a stand alone node or may be part of any other node. The exemplary network environment also contains and one or more communications links between the client computer and the various system nodes.

Exemplary Computing Device

Figure 11:
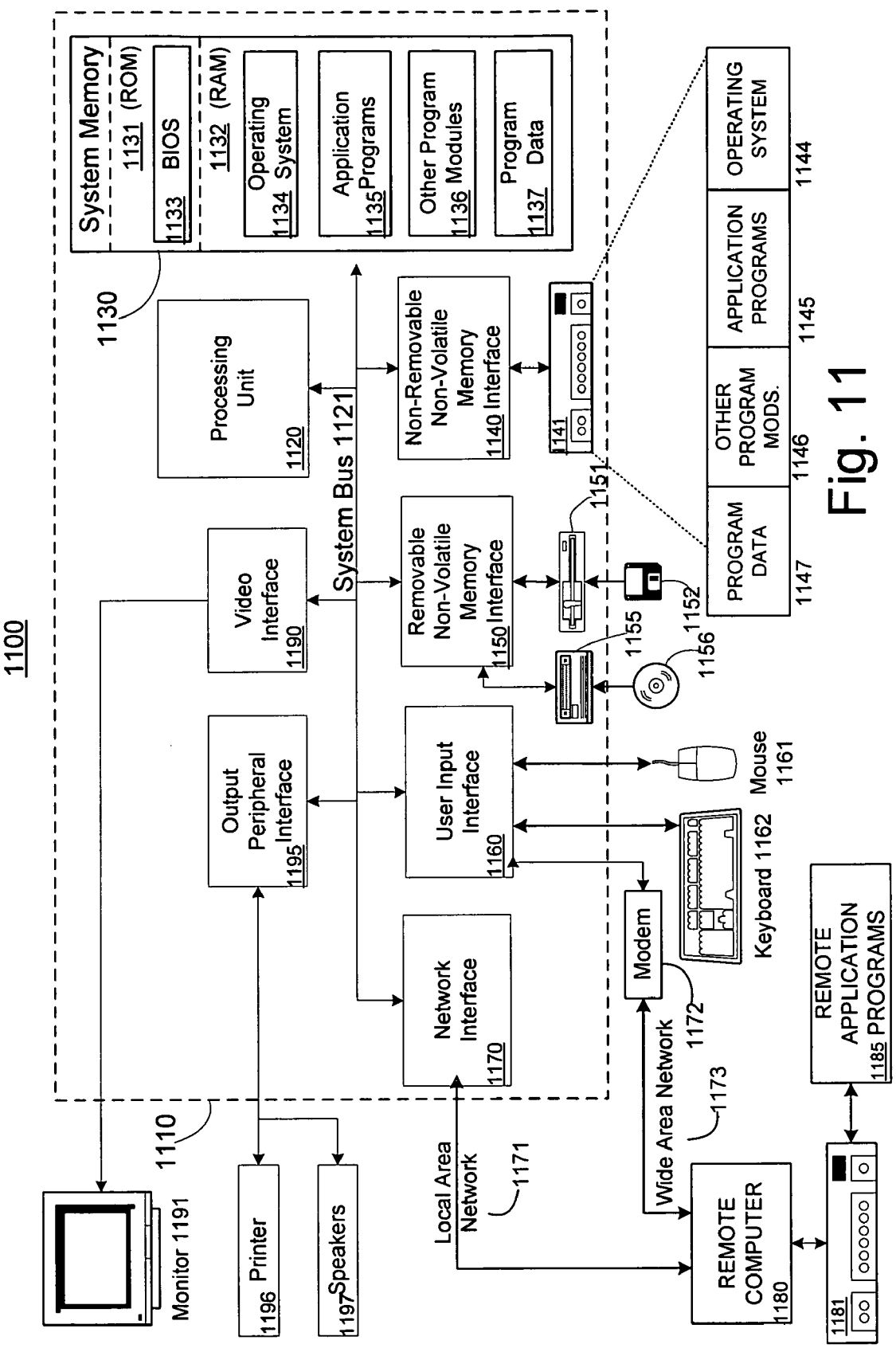
FIG. 11 is a block diagram showing an exemplary computing environment in which aspects of the invention may be implemented.

FIG. 11 and the following discussion are intended to provide a brief general description of a suitable computing environment in which embodiments of the invention may be implemented. It should be understood, however, that handheld, portable and other computing devices and computing objects of all kinds are contemplated for use in connection with embodiments of the invention. Thus, while a general purpose computer is described below, this is but one example, and embodiments of the invention may be implemented with other computing devices, such as a client having network/bus interoperability and interaction. Thus, embodiments of the invention may be implemented in an environment of networked hosted services in which very little or minimal client resources are implicated, e.g., a networked environment in which the client device serves merely as an interface to the network/bus, such as an object placed in an appliance, or other computing devices and objects as well. In essence, anywhere that data may be stored or from which data may be retrieved is a desirable, or suitable, environment for operation.

Generally, embodiments of the invention may be used in conjunction with a smartcard or hardware security module, HSM, or other mechanism for any combination of cryptographic key storage, key generation and protected key storage. Although not required, embodiments of the invention can also be implemented via an operating system, for use by a developer of services for a device or object, and/or included within application software. Software may be described in the general context of computer-executable instructions, such as program modules, being executed by one or more computers, such as client workstations, servers or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that various embodiments of the invention may be practiced with other computer configurations. Other well known computing systems, environments, and/or configurations that may be suitable for use include, but are not limited to, personal computers (PCs), automated teller machines, server computers, hand-held or laptop devices, multi-processor systems, microprocessor-based systems, programmable consumer electronics, network PCs, appliances, lights, environmental control elements, minicomputers, mainframe computers and the like. Embodiments of the invention may also be practiced in distributed computing environments where tasks are performed by remote processing devices that are linked through a communications network/bus or other data transmission medium. In a distributed computing environment, program modules may be located in both local and remote computer storage media including memory storage devices and client nodes may in turn behave as server nodes.

FIG. 11 thus illustrates an example of a suitable computing system environment 1100 in which the embodiments of the invention may be implemented, although as made clear above, the computing system environment 1100 is only one example of a suitable computing environment and is not intended to suggest any limitation as to the scope of use or functionality of an embodiment of the invention. Neither should the computing environment 1100 be interpreted as having any dependency or requirement relating to any one or combination of components illustrated in the exemplary operating environment 1100.

With reference to FIG. 11, an exemplary system for implementing an embodiment of the invention includes a general purpose computing device in the form of a computer system 1110. Components of computer system 1110 may include, but are not limited to, a processing unit 1120, a system memory 1130, and a system bus 1121 that couples various system components including the system memory to the processing unit 1120. The system bus 1121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer system 1110 typically includes a variety of computer readable media. Computer readable media can be any available media that can be accessed by computer system 1110 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, Random Access Memory (RAM), Read Only Memory (ROM), Electrically Erasable Programmable Read Only Memory (EEPROM), flash memory or other memory technology, Compact Disk Read Only Memory (CDROM), compact disc-rewritable (CDRW), digital versatile disks (DVD) or other optical disk storage, magnetic cassettes, magnetic tape, magnetic disk storage or other magnetic storage devices, or any other medium which can be used to store the desired information and which can accessed by computer system 1110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 1130 includes computer storage media in the form of volatile and/or nonvolatile memory such as read only memory (ROM) 1131 and random access memory (RAM) 1132. A basic input/output system 1133 (BIOS), containing the basic routines that help to transfer information between elements within computer system 1110, such as during start-up, is typically stored in ROM 1131. RAM 1132 typically contains data and/or program modules that are immediately accessible to and/or presently being operated on by processing unit 1120. By way of example, and not limitation, FIG. 11 illustrates operating system 1134, application programs 1135, other program modules 1136, and program data 1137.

The computer system 1110 may also include other removable/non-removable, volatile/nonvolatile computer storage media. By way of example only, FIG. 11 illustrates a hard disk drive 1141 that reads from or writes to non-removable, nonvolatile magnetic media, a magnetic disk drive 1151 that reads from or writes to a removable, nonvolatile magnetic disk 1152, and an optical disk drive 1155 that reads from or writes to a removable, nonvolatile optical disk 1156, such as a CD ROM, CDRW, DVD, or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 1141 is typically connected to the system bus 1121 through a non-removable memory interface such as interface 1140, and magnetic disk drive 1151 and optical disk drive 1155 are typically connected to the system bus 1121 by a removable memory interface, such as interface 1150.

The drives and their associated computer storage media discussed above and illustrated in FIG. 11 provide storage of computer readable instructions, data structures, program modules and other data for the computer system 1110. In FIG. 11, for example, hard disk drive 1141 is illustrated as storing operating system 1144, application programs 1145, other program modules 1146, and program data 1147. Note that these components can either be the same as or different from operating system 1134, application programs 1135, other program modules 1136, and program data 1137. Operating system 1144, application programs 1145, other program modules 1146, and program data 1147 are given different numbers here to illustrate that, at a minimum, they are different copies. A user may enter commands and information into the computer system 1110 through input devices such as a keyboard 1162 and pointing device 1161, commonly referred to as a mouse, trackball or touch pad. Other input devices (not shown) may include a microphone, joystick, game pad, satellite dish, scanner, or the like. These and other input devices are often connected to the processing unit 1120 through a user input interface 1160 that is coupled to the system bus 1121, but may be connected by other interface and bus structures, such as a parallel port, game port or a universal serial bus (USB). A monitor 1191 or other type of display device is also connected to the system bus 1121 via an interface, such as a video interface 1190, which may in turn communicate with video memory (not shown). In addition to monitor 1191, computer systems may also include other peripheral output devices such as speakers 1197 and printer 1196, which may be connected through an output peripheral interface 1195.

The computer system 1110 may operate in a networked or distributed environment using logical connections to one or more remote computers, such as a remote computer 1180. The remote computer 1180 may be a personal computer, a server, a router, a network PC, a peer device or other common network node, and typically includes many or all of the elements described above relative to the computer system 1110, although only a memory storage device 1181 has been illustrated in FIG. 11. The logical connections depicted in FIG. 11 include a local area network (LAN) 1171 and a wide area network (WAN) 1173, but may also include other networks/buses. Such networking environments are commonplace in homes, offices, enterprise-wide computer networks, intranets and the Internet.

When used in a LAN networking environment, the computer system 1110 is connected to the LAN 1171 through a network interface or adapter 1170. When used in a WAN networking environment, the computer system 1110 typically includes a modem 1172 or other means for establishing communications over the WAN 1173, such as the Internet. The modem 1172, which may be internal or external, may be connected to the system bus 1121 via the user input interface 1160, or other appropriate mechanism. In a networked environment, program modules depicted relative to the computer system 1110, or portions thereof, may be stored in the remote memory storage device. By way of example, and not limitation, FIG. 11 illustrates remote application programs 1185 as residing on memory device 1181. It will be appreciated that the network connections shown are exemplary and other means of establishing a communications link between the computers may be used.

Various distributed computing frameworks have been and are being developed in light of the convergence of personal computing and the Internet. Individuals and business users alike are provided with a seamlessly interoperable and Web-enabled interface for applications and computing devices, making computing activities increasingly Web browser or network-oriented.

For example, MICROSOFT®'s .NET™ platform, available from Microsoft Corporation, includes servers, building-block services, such as Web-based data storage, and downloadable device software. While exemplary embodiments herein are described in connection with software residing on a computing device, one or more portions of an embodiment of the invention may also be implemented via an operating system, application programming interface (APT) or a "middle man" object between any of a coprocessor, a display device and a requesting object, such that operation may be performed by, supported in or accessed via all of .NET™'s languages and services, and in other distributed computing frameworks as well.

As mentioned above, while exemplary embodiments of the invention have been described in connection with various computing devices and network architectures, the underlying concepts may be applied to any computing device or system in which it is desirable to implement information segregation in a multiparty transaction. Thus, the methods and systems described in connection with embodiments of the present invention may be applied to a variety of applications and devices. While exemplary programming languages, names and examples are chosen herein as representative of various choices, these languages, names and examples are not intended to be limiting. One of ordinary skill in the art will appreciate that there are numerous ways of providing object code that achieves the same, similar or equivalent systems and methods achieved by embodiments of the invention.

The various techniques described herein may be implemented in connection with hardware or software or, where appropriate, with a combination of both. Thus, the methods and apparatus of the invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. One or more programs that may utilize the signal processing services of an embodiment of the present invention, e.g., through the use of a data processing API or the like, are preferably implemented in a high level procedural or object oriented programming language to communicate with a computer. However, the program(s) can be implemented in assembly or machine language, if desired. In any case, the language may be a compiled or interpreted language, and combined with hardware implementations.

The methods and apparatus of an embodiment of the present invention may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, or a receiving machine having the signal processing capabilities as described in exemplary embodiments above becomes an apparatus for practicing the invention. When implemented on a general-purpose processor, the program code combines with the processor to provide a unique apparatus that operates to invoke the functionality of the discussed embodiments of the invention. Additionally, any storage techniques used in connection with an embodiment may invariably be a combination of hardware and software.

While aspects of the present invention has been described in connection with the preferred embodiments of the various figures, it is to be understood that other similar embodiments may be used or modifications and additions may be made to the described embodiment for performing the same function of the present invention without deviating therefrom. Furthermore, it should be emphasized that a variety of computer platforms, including handheld device operating systems and other application specific operating systems are contemplated, especially as the number of wireless networked devices continues to proliferate. Therefore, the claimed invention should not be limited to any single embodiment, but rather should be construed in breadth and scope in accordance with the appended claims.

What is claimed:

1. A method of protecting a message having information in a multiparty transaction, the method comprising:
   obtaining, in response to a user request, from a primary transaction participant, identities of at least two transaction participants in the multiparty transaction;
   obtaining, in response to a user request, cryptographic information corresponding to the at least two transaction participants;
   dividing, by a user, the information into segments and placing only a relevant portion of the information which is needed by a particular transaction participant into a segment;
   cryptographically encoding the segments using the cryptographic information corresponding to the particular transaction participant;
   transmitting the cryptographically encoding segments to one of the transaction participants identified as the primary transaction participant; and
   transmitting the cryptographically encoding segments to the at least two transaction participants.

2. The method of claim 1, wherein obtaining identities of at least two transaction participants comprises acquiring the identities from one of the transaction participants.

3. The method of claim 1, wherein obtaining cryptographic information comprises acquiring cryptographic information from at least one of a directory and cryptographic identity provider.

4. The method of claim 3, wherein the cryptographic identity provider is not one of the transaction participants.

5. A method of controlling data content exposure in a multiparty transaction, the method comprising:
   obtaining, in response to a user request, from a primary transaction participant, at least two identities of secondary transaction participants to be involved in a multiparty transaction;
   obtaining, in response to a user request, cryptographic information for the at least two secondary transaction participants, each secondary transaction participant having unique cryptographic information;
   cryptographically encoding a unique portion of the data content for each of the at least two secondary transaction participants such that a unique data content and a unique encryption are used for each secondary transaction participant, the unique portion of the data content selected by the user such that only a relevant portion of the data content which is needed by a particular secondary transaction participant is encoded for that particular secondary transaction participant; and
   transmitting the cryptographically encoded information to the at least two secondary transaction participants.

6. The method of claim 5, wherein transmitting the cryptographically encoded information comprises transmitting the cryptographically encoded information to the primary transaction participant.

7. The method of claim 6, further comprising:
   receiving status from the primary transaction participant concerning a successful examination of data content by one or more of the at least two secondary transaction participants, whereby multiparty transaction status is assessed.

8. The method of claim 5, further comprising transmitting a message request to act upon the information represented by the data content so as to execute the multiparty transaction.

9. A computer-readable storage medium having computer-executable instructions for performing a method of protecting a message having information in a multiparty transaction, the method comprising:
   obtaining, in response to a user request, from a primary transaction participant, identities of at least two transaction participants in the multiparty transaction;
   obtaining, in response to a user request, cryptographic information corresponding to the at least two transaction participants;
   dividing, by a user, the information into segments and placing only a relevant portion of the information which is needed by a particular transaction participant into a segment;
   cryptographically encoding the segments using the cryptographic information corresponding to the particular transaction participant; and
   transmitting the cryptographically encoding segments to the at least two transaction participants.

10. The computer-readable storage medium of claim 9, wherein obtaining identities of at least two transaction participants comprises acquiring the identities from one of the transaction participants.

11. The computer-readable storage medium of claim 9, wherein obtaining cryptographic information comprises acquiring cryptographic information from at least one of a directory and cryptographic identity provider.

12. A system comprising:
   a processor having access to memory, the memory having instructions which, when executed, perform the method of protecting a message having information in a multiparty transaction, the method comprising:
   obtaining, in response to a user request, from a primary transaction participant, identities of at least two transaction participants in the multiparty transaction;
   obtaining, in response to a user request, cryptographic information corresponding to the at least two transaction participants;
   dividing, by a user, the information into segments and placing only a relevant portion of the information which is needed by a particular transaction participant into a segment;
   cryptographically encoding the segments using the cryptographic information corresponding to the particular transaction participant;
   transmitting the cryptographically encoding segments to one of the transaction participants identified as the primary transaction participant; and
   transmitting the cryptographically encoding segments to the at least two transaction participants.

13. The system of claim 12, wherein the instructions having the method step of obtaining identities of at least two transaction participants comprise acquiring the identities from one of the transaction participants.

14. The system of claim 12, wherein the instruction having the method step of obtaining cryptographic information comprise acquiring cryptographic information from at least one of a directory and cryptographic identity provider.

15. A system comprising:
a processor having access to memory, the memory having instructions which, when executed, perform the method of controlling data content exposure in a multiparty transaction, the method comprising:
obtaining, in response to a user request, from a primary transaction participant, at least two identities of secondary transaction participants to be involved in a multiparty transaction;
obtaining, in response to a user request, cryptographic information for the at least two secondary transaction participants, each secondary transaction participant having unique cryptographic information;
cryptographically encoding a unique portion of the data content for each of the at least two secondary transaction participants such that a unique data content and a unique encryption are used for each secondary transaction participant, the unique portion of the data content selected by the user such that only a relevant portion of the data content which is needed by a particular secondary transaction participant is encoded for that particular secondary transaction participant; and
transmitting the cryptographically encoded information to the at least two secondary transaction participants.

16. The system of claim 15, wherein the instructions performing the method step of transmitting the cryptographically encoded information comprise transmitting the cryptographically encoded information to the primary transaction participant.

17. The system of claim 15, wherein the instructions performing the method further comprise:
receiving status from the primary transaction participant concerning a successful examination of data content by one or more of the at least two secondary transaction participants, whereby multiparty transaction status is assessed.

18. The system of claim 15, wherein the instructions performing the method step of cryptographically encoding information for the at least two secondary transaction participants comprise encoding a data content that is unique for at least one of the at least two secondary transaction participants.

19. The system method of claim 15, wherein the instructions performing the method steps further comprise transmitting a message request to act upon the information represented by the data content so as to execute the multiparty transaction.

* * * * *